(12) United States Patent
Kato et al.

(10) Patent No.: US 7,992,822 B2
(45) Date of Patent: Aug. 9, 2011

(54) LEADING EDGE SKIN HEIGHT DIFFERENCE ADJUSTING STRUCTURE AND METHOD OF ASSEMBLING LEADING EDGE SKIN

(75) Inventors: Hiroshi Kato, Saitama (JP); Ken Ohizumi, Saitama (JP); Kazuhide Hasegawa, Saitama (JP); Takahiro Kunichi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 797 days.

(21) Appl. No.: 11/984,539

(22) Filed: Nov. 19, 2007

(65) Prior Publication Data
US 2008/0164376 A1 Jul. 10, 2008

(30) Foreign Application Priority Data
Nov. 20, 2006 (JP) .................................. 2006-312660

(51) Int. Cl.
*B64C 1/12* (2006.01)
(52) U.S. Cl. ..................... 244/132; 244/131; 244/123.1; 29/407.05
(58) Field of Classification Search .................. 244/131, 244/123.1, 132; 29/407.05
See application file for complete search history.

(56) References Cited

U.S. PATENT DOCUMENTS

| | | | | |
|---|---|---|---|---|
| 2,015,020 A | * | 9/1935 | Rowe | 52/546 |
| 2,496,024 A | | 1/1950 | Schwendler et al. | |
| 3,217,773 A | * | 11/1965 | Munse | 411/175 |
| 5,845,872 A | * | 12/1998 | Pridham et al. | 244/1 A |
| 6,073,899 A | * | 6/2000 | Omrani | 248/311.2 |
| 6,907,651 B1 | * | 6/2005 | Fisher et al. | 29/407.05 |
| 7,118,070 B2 | * | 10/2006 | Abrams et al. | 244/129.3 |
| 2005/0061943 A1 | * | 3/2005 | Holden | 248/500 |
| 2005/0103942 A1 | | 5/2005 | Abrams et al. | |
| 2008/0258008 A1 | * | 10/2008 | Cooper | 244/131 |

FOREIGN PATENT DOCUMENTS

| | | |
|---|---|---|
| GB | 845138 | 8/1960 |
| JP | 2004-025946 A | 1/2004 |
| JP | 2004-520209 A | 7/2004 |

* cited by examiner

*Primary Examiner* — Tien Dinh
*Assistant Examiner* — Justin Benedik
(74) *Attorney, Agent, or Firm* — Birch, Stewart, Kolasch & Birch, LLP

(57) ABSTRACT

A plate material is formed into a height difference adjusting member having a J-shape such that its shim portion and resilient support portion are opposed to each other. The height difference adjusting member is mounted on a spar such that the shim portion and the resilient support portion are resiliently mounted to a flange of the spar. A rear end of a leading edge skin is fixed to the flange by a fastener in a state where the shim portion of the height difference adjusting member is interposed between the leading edge skin and the flange. The shim portion adjusts a difference in height between a front end of a main body skin and the rear end of the leading edge skin. Even if a large number of height difference adjusting members are mounted on the spar, the height difference adjusting members do not fall off and are not displaced.

20 Claims, 6 Drawing Sheets

LEADING EDGE SKIN HEIGHT DIFFERENCE ADJUSTING STRUCTURE AND METHOD OF ASSEMBLING LEADING EDGE SKIN

CROSS-REFERENCE TO RELATED APPLICATIONS

The present application claims priority under 35 USC 119 to Japanese Patent Application No. 2006-312660 filed on Nov. 20, 2006 the entire contents thereof is hereby incorporated by reference.

BACKGROUND OF THE INVENTION

1. Field of the Invention

The present invention relates to a leading edge skin height difference adjusting structure comprising a height difference adjusting member, and fixing a rear end of a leading edge skin to a spar of a main wing of an aircraft with the height difference adjusting member interposed therebetween, while adjusting a difference in height between a front end of a main body skin and the rear end of the leading edge skin when the main body skin and the leading edge skin are brought into abutment on each other and fixed to the spar by a fastener. The present invention also relates to a method of assembling a leading edge skin by using the leading edge skin height difference adjusting structure.

2. Description of Background Art

For the purpose of suppressing differences in thickness generated at connection portions between skins which are fixed to a frame of an aircraft, down to a level lower than a tolerance, Published Japanese Translation No. 2004-520209 of PCT Application No. PCT/GB2000/003165 discloses a method comprising the steps of: applying a shim material on the frame of the aircraft, the shim material also serving as flowable adhesive containing resin and filler; the shim material is cured; and machining the cured shim material to a desired thickness to obtain a smooth skin connection portions fixed on a surface of the machined shim material.

However, the above-described conventional method requires troublesome temperature control for the flowable shim material and machining for thickness adjustment, leading to a drawback by increasing the cost.

It is a conventional known method to interpose a shim having a predetermined thickness between coupling portions of two members. However, in the case where a long leading edge skin is fixed by fasteners to a spar of a main wing of an aircraft, it is required to simultaneously arrange a large number of shims in the span direction. Because it is extremely difficult to hold the plurality of shims so that the shims are not displaced from the predetermined locations, there is a problem with respect to poor workability.

SUMMARY OF THE INVENTION

The present invention has been made in view of the above situation, and has an object to improve the workability when a main body skin and a leading edge skin are brought into abutment on each other and fixed on a spar of a wing of an aircraft by fasteners so that no difference in height is generated between the main body skin and the leading edge skin.

To achieve the above object, according to an embodiment of the present invention, there is provided a leading edge skin height difference adjusting structure comprising a height difference adjusting member for fixing a rear end of a leading edge skin to a spar of a main wing of an aircraft, with the height difference adjusting member interposed therebetween, while adjusting a difference in height between a front end of a main body skin and the rear end of the leading edge skin when the main body skin and the leading edge skin are brought into abutment on each other and fixed on the spar with a fastener. The height difference adjusting member is formed from a plate material into a J- or U-shape comprising a shim portion and a resilient support portion which are opposed to each other, and is mounted on the spar so as to resiliently cramp a flange of the spar between the shim portion and the resilient support portion. The leading edge skin is fixed to the flange by the fastener in a state wherein the shim portion is interposed between the leading edge skin and the flange.

A main wing 12 is provided together with a front spar 14, a front flange 14b and upper and lower skins 17 and 18.

With this embodiment of the present invention, the height difference adjusting member is formed from a plate material into a J- or U-shape comprising the shim portion and the resilient support portion which are opposed to each other, and is mounted on the spar so as to resiliently cramp the flange of the spar between the shim portion and the resilient support portion. The leading edge skin is fixed to the flange by the fastener in a state wherein the shim portion is interposed between the leading edge skin and the flange. Therefore, the shim portion adjusts a difference in height between the front end of the main body skin and the rear end of the leading edge skin. Also, even if a large number of height difference adjusting members are mounted to the spar, the height difference adjusting members do not fall off and are not displaced. Thus, workability is improved in fixing the leading edge skin to the spar.

According to an embodiment of the present invention, there is provided a leading edge skin height difference adjusting structure including a height difference adjusting member for fixing a rear end of a leading edge skin to a spar of a main wing of an aircraft with the height difference adjusting member interposed therebetween, while adjusting a difference in height between a front end of a main body skin and the rear end of the leading edge skin when the main body skin and the leading edge skin are brought into abutment on each other and fixed on the spar with a fastener The height difference adjusting member is a cylindrical member comprising a male thread which is formed on an outer peripheral surface thereof and which is screw-engagable to a desired amount in a female thread 14f formed in a flange 14b of the spar, and a fastener hole penetrating a central portion thereof. The leading edge skin is fixed to the flange by the fastener passing through the fastener hole in a state wherein the leading edge skin abuts on an end surface of the height difference adjusting member which projects to a predetermined amount from a surface of the flange.

With this embodiment of the present invention, the height difference adjusting member is a cylindrical member including the male thread which is formed on an outer peripheral surface thereof and which is screw-engagable to a desired amount in the female thread formed in the flange of the spar. A fastener hole penetrates a central portion thereof. The leading edge skin is fixed to the flange by the fastener passing through the fastener hole in a state wherein the leading edge skin abuts on an end surface of the height difference adjusting member which projects a predetermined amount from a surface of the flange. Therefore, the shim portion adjusts a difference in height between the front end of a main body skin and the rear end of the leading edge skin. Also, even if a large number of height difference adjusting members are mounted on the spar, the height difference adjusting members do not fall off or are displaced. Thus, workability is improved in fixing the leading edge skin to the spar. Further, only a single type of the height difference adjusting members is required to suppress an increase in the cost, and the amount of screw engagement can be steplessly adjusted to further reduce the difference in height.

According to an embodiment of the present invention, there is provided a method of assembling a leading edge skin by using the leading edge skin height difference adjusting structure. The method includes the steps of: temporarily assembling the leading edge skin on the spar to which the main body skin is fixed; measuring differences in height between the front end of the main body skin and the rear end of the leading edge skin at a plurality of locations in the span direction of the wing; selecting the height difference adjusting members having the shin portions with thicknesses corresponding to the differences in height; temporarily mounting, on the spar, the height difference adjusting members selected with respect to the plurality of locations in the span direction of the wing; and mounting the leading edge skin on the spar with the temporarily-mounted height difference adjusting members interposed therebetween, and completing the assembly of the leading edge skin with the fasteners.

With this embodiment of the present invention, the leading edge skin is temporarily assembled on the spar to which the main body skin is fixed. The differences in height between the front end of the main body skin and the rear end of the leading edge skin are measured at a plurality of locations in the span direction of the wing. The height difference adjusting members having the shin portions with thicknesses corresponding to the differences in height are selected with the height difference adjusting members selected with respect to the plurality of locations in the span direction of the wing being temporarily mounted on the spar. The leading edge skin is mounted on the spar with the temporarily-mounted height difference adjusting members interposed therebetween with the completion of the assembly of the leading edge skin being accomplished by fastening the fasteners. Therefore, it is possible to adjust the differences in height, over the entire length of the wing, between the front end of the main body skin extending along in the span direction of the wing and the rear end of the leading edge skin, and also the workability in assembling is excellent.

According to an embodiment of the present invention, there is provided a method of assembling a leading edge skin by using the leading edge skin height difference adjusting structure. The method includes the steps of temporarily assembling the leading edge skin on the spar to which the main body skin is fixed. Measuring the differences in height between the front end of the main body skin and the rear end of the leading edge skin at a plurality of locations in the span direction of the wing. Mounting the height difference adjusting members on the spar at the plurality of locations in the span direction of the wing. Adjusting the amount of projection of the end surfaces of the height difference adjusting members from the surface of the spar in correspondence to the differences in height and mounting the leading edge skin on the spar with the height difference adjusting members interposed therebetween, and completing the assembly of the leading edge skin with the fasteners.

With this embodiment of the present invention, the leading edge skin is temporarily assembled on the spar to which the main body skin is fixed. Thus, differences in height between the front end of the main body skin and the rear end of the leading edge skin are measured at a plurality of locations in the span direction of the wing. In addition, the height difference adjusting members are mounted on the spar at the plurality of locations in the span direction of the wing with the amounts of projection of the end surfaces of the height difference adjusting members from the surface of the spar being adjusted in correspondence to the differences in height and mounting the leading edge skin on the spar with the height difference adjusting members interposed therebetween. Thus, the assembly of the leading edge skin by fastening the fasteners is completed. Therefore, it is possible to adjust the differences in height, over the entire length of the wing, between the front end of the main body skin extending long in the span direction of the wing and the rear end of the leading edge skin. In addition, the workability in assembling is excellent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
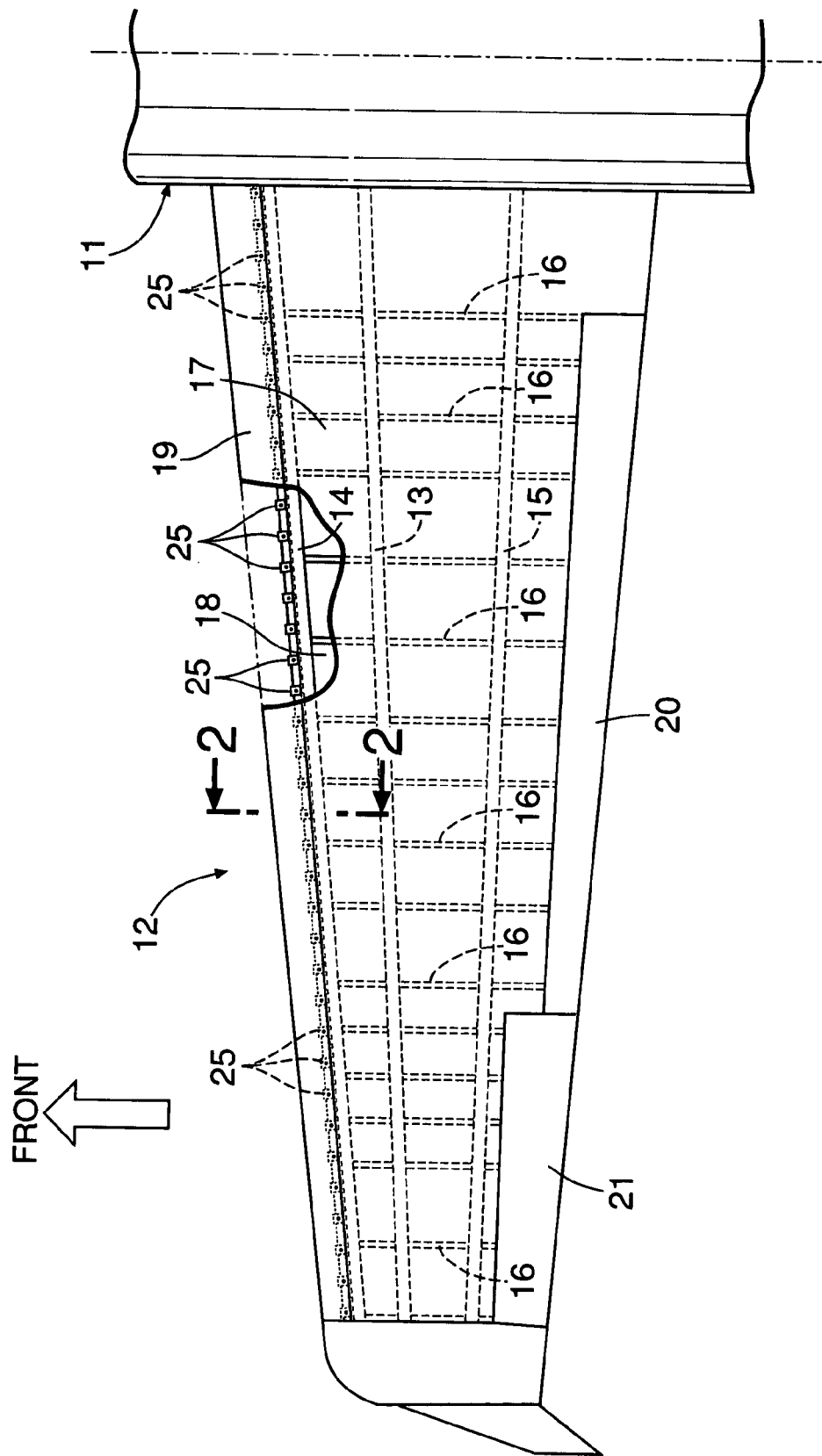
FIG. 1 is a top view of a left main wing of an aircraft which includes a height difference adjusting member according to a first embodiment of the present invention.
Figure 2:
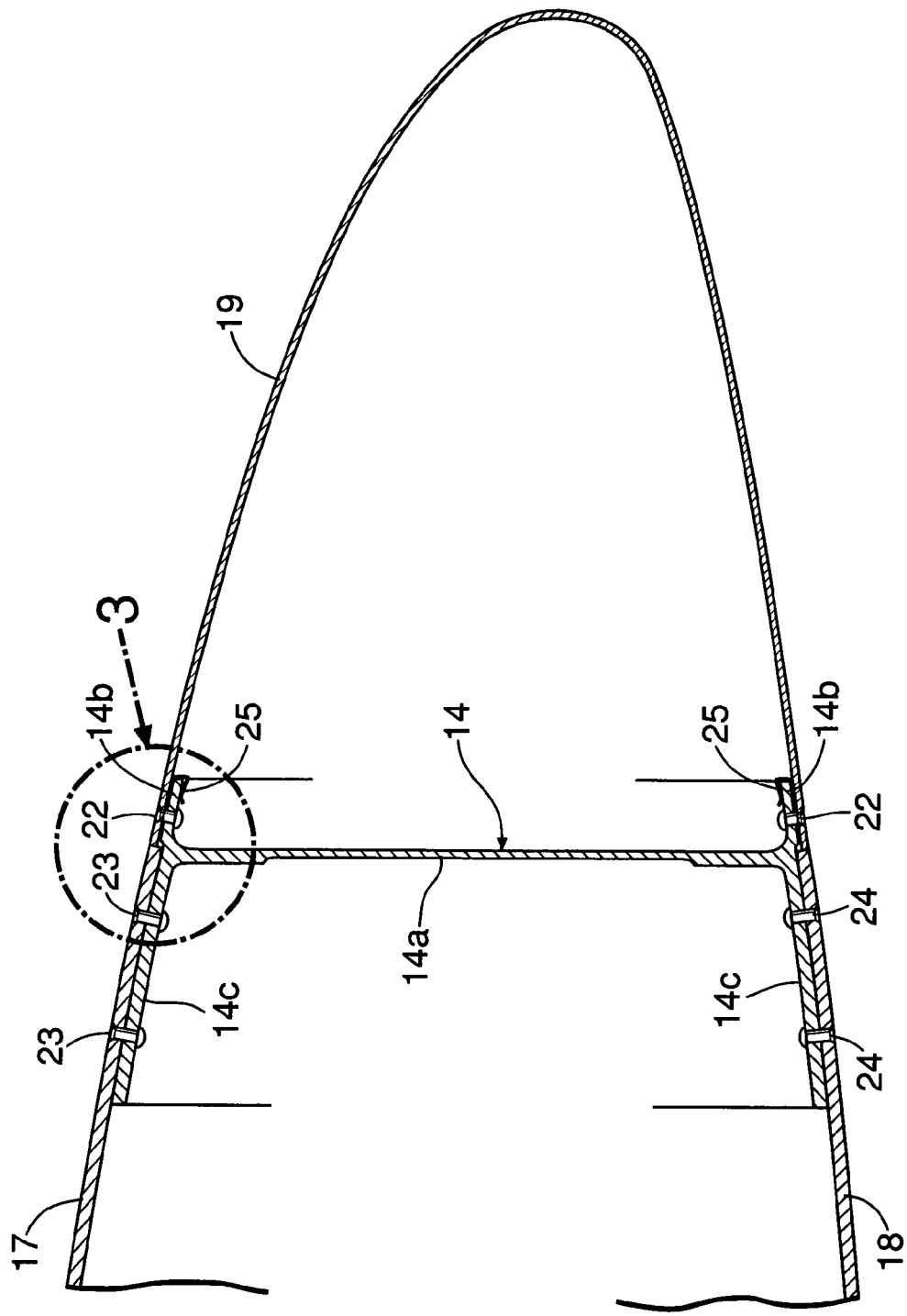
FIG. 2 is an enlarged sectional view taken along line 2-2 in FIG. 1.

As shown in FIGS. 1 and 2, a main wing 12, supported on a fuselage 11 of an aircraft, includes a main spar 13 extending substantially in the span direction, a front spar 14 arranged in front of the main spar 13 and a rear spar 15 placed in the rear of the main spar 13. A large number of ribs 16 extending in the chord direction are supported on the three spars 13, 14, and 15. The upper and lower surfaces of the three spars 13, 14, 15 and the ribs 16 are respectively covered with an upper skin 17 and a lower skin 18. A leading edge skin 19 having a U-shaped cross section is connected to a front portion of the front spar 14. A flap 20 is swingably supported on a trailing edge portion of the main wing 12 on an inner side in the span direction. An aileron 21 is swingably supported on the flap 20 on an outer side in the span direction.

The front spar 14 is a member having an I-shaped cross section, including a web 14a extending in the wing thickness direction, a pair of front flanges 14b, 14b projecting forward from upper and lower opposite ends of the web 14a and a pair of rear flanges 14c, 14c projecting rearwardly from the upper end lower opposite ends of the web 14a.

The upper and lower rear ends of the leading edge skin 19 are superposed on the upper and lower surfaces of the upper and lower front flanges 14b, 14b of the front spar 14, respectively, and are fixed thereto by fasteners 22, 22. The front end of the upper skin 17 is superposed on the upper surface of the upper rear flange 14c of the front spar 14, and is fixed thereto by fasteners 23. The front end of the lower skin 18 is superposed on the lower surface of the lower rear flange 14c of the front spar 14, and is fixed thereto by fasteners 24. The leading edge skin 19 has a wall thickness smaller than the wall thickness of the upper skin 17 and the lower skin 18. To absorb the differences between the wall thicknesses, differences in height are set between the surfaces of the front flanges 14b, 14b and the surfaces of the rear flanges 14c, 14c in the front spar 14.

Figure 4:
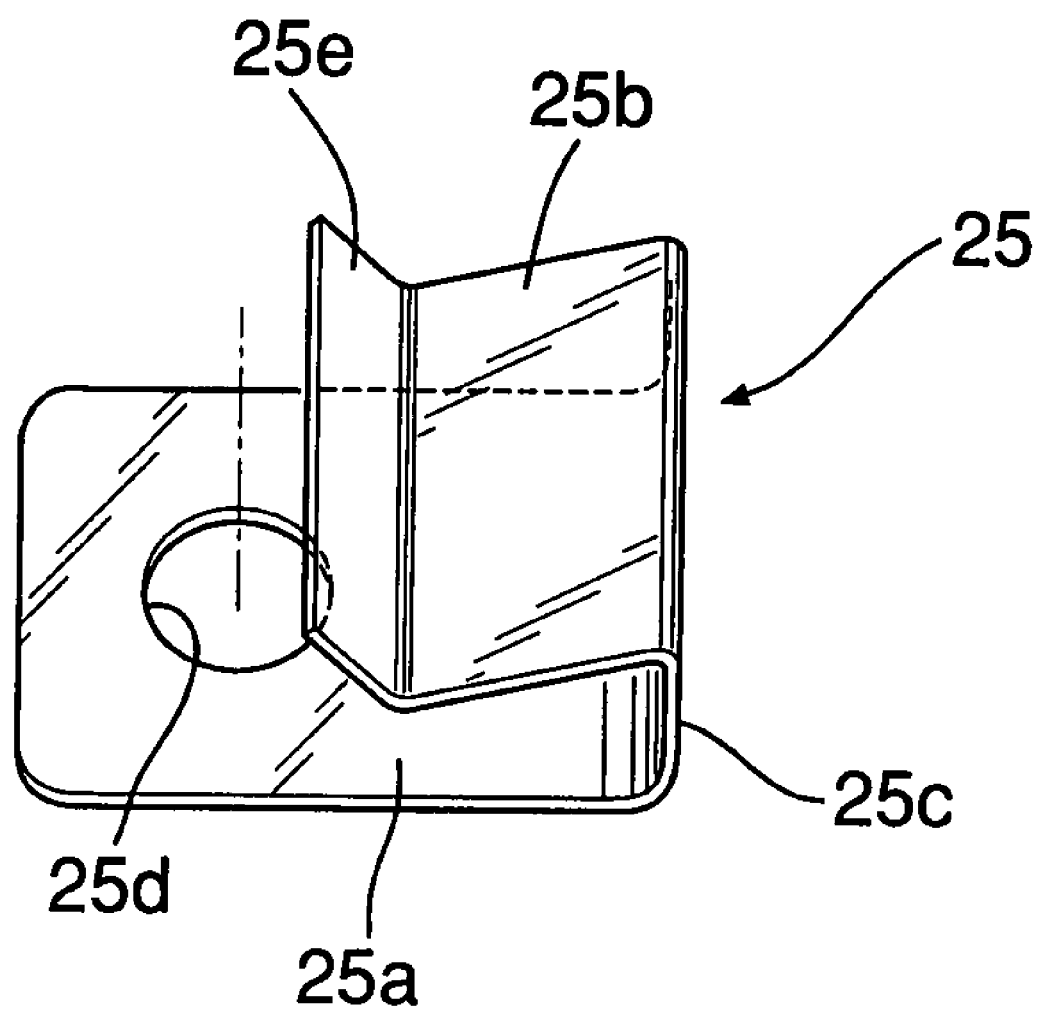
FIG. 4 is a perspective view of the height difference adjusting member.

A height difference adjusting member 25 is interposed between each front flange 14b, 14b and the corresponding rear end of the leading edge skin 19. As shown in FIG. 4, the height difference adjusting member 25 is formed by bending a metal plate into the shape of J. A longer shim portion 25a and a shorter resilient support portion 25b facing each other are integrally connected to each other by a connecting portion 25c. A fastener hole 25d is formed through the shim portion 25a. A guide portion 25e, bent in a direction away from the shim portion 25a, is provided at the distal end of the resilient support portion 25b. The height of the connecting portion 25c is set slightly larger than the wall thickness of the front flange 14b, 14b of the front spar 14. The distance between the shim portion 25a and the resilient support portion 25b is narrower on the distal end side when the height difference adjusting member 25 is in a free state. A plurality of types of height difference adjusting members 25 having the above-described structure are prepared beforehand such that they have the same shape but only differ in wall thickness.

Figure 3:
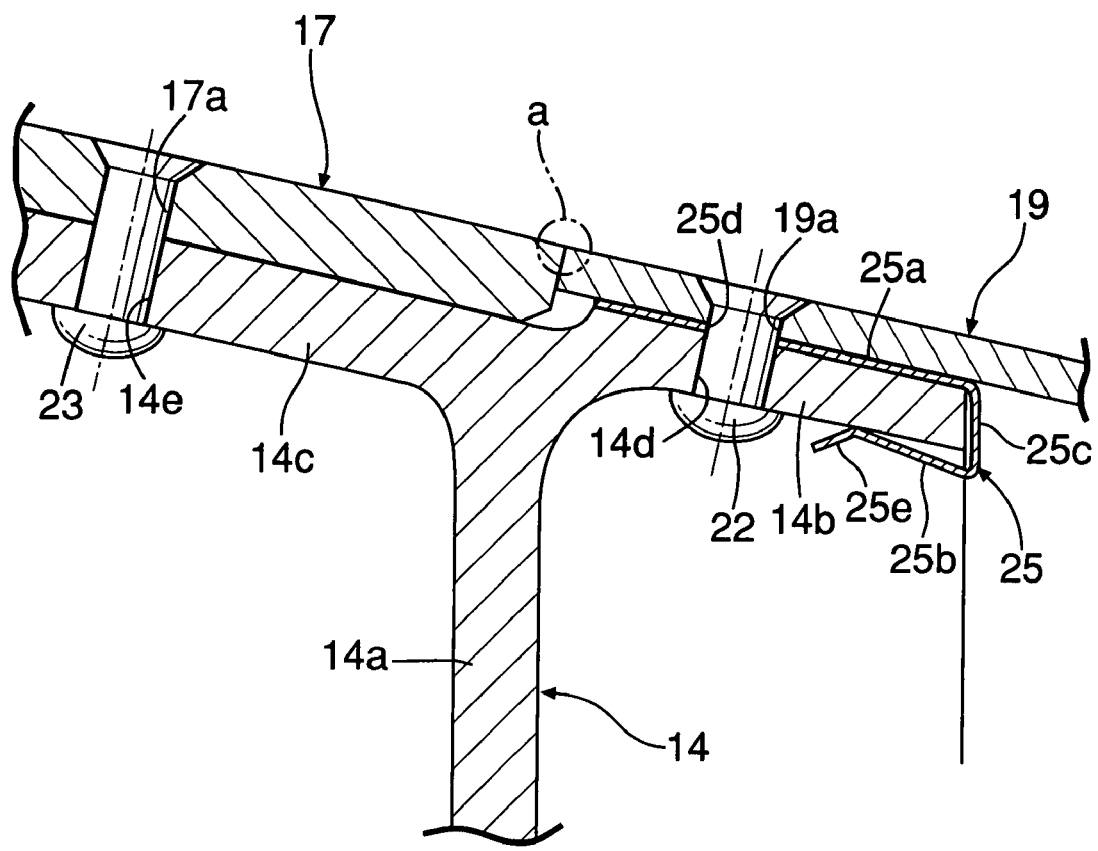
FIG. 3 is an enlarged view of portion 3 in FIG. 2.

FIG. 3 shows the structure of a portion in which the leading edge skin 19 and the upper skin 17 are fixed on the upper front and rear flanges 14b and 14c of the front spar 14.

The height difference adjusting members 25 are mounted in advance on the front flange 14b of the front spar 14. The height difference adjusting members 25 are disposed such that the shim portions 25a contact the upper surface of the front flange 14b and the resilient support portions 25b contact the lower surface of the front flange 14b. Each of the height difference adjusting member 25 is held on the front spar 14 so as not to fall off therefrom by the resilience force of the resilient support portion 25b expanded from its free state. When the height difference adjusting member 25 is mounted on the front spar 14 by sliding the height difference adjusting member 25 rearward from the front edge of the front flange 14b, the mounting is facilitated by bending the resilient support portion 25b away from the shim portion 25a.

When the height difference adjusting members 25 are mounted in this way, the fastener holes 25d of the height difference adjusting members 25 are aligned with fastener holes 19a in the leading edge skin 19 and fastener holes 14d in the front flange 14b. The fasteners 22 are passed through the fastener holes 19a, 25d and 14d, thereby fixing the leading edge skin 19 to the front flange 14b. The fasteners 23 are passed through fastener holes 17a formed in the upper skin 17 and fastener holes 14e formed in the rear flange 14c, thereby fixing the upper skin 17 to the rear flange 14c.

As described above, even in a case where differences in height are generated in abutment portions between the front end of the upper skin 17 and the rear end of the leading edge skin 19 (portion a shown in FIG. 3) due to variations in the heights of the surfaces of the front and rear flanges 14b and 14c of the front spar 14, the wall thicknesses of the upper skin 17 and the leading edge skin 19 and the like, if the height difference adjusting members 25 having thicknesses corresponding to the differences in height are mounted on the front flange 14b and the leading edge skin 19 is fixed thereto, it is possible to smoothly connect the front end of the upper skin 17 to the rear end of the leading edge skin 19 (such that, for example, the difference in height is 0.5 mm or less), thereby minimizing disturbance in air flow.

Further, the height difference adjusting member 25 mounted on the front flange 14b is held thereon by its own resiliency. Therefore, in the case where the leading edge skin 19 is fixed by using a large number of height difference adjusting members 25 disposed at predetermined intervals in the span direction as shown in FIG. 1, there is substantially no possibility that the height difference adjusting members 25 fall off or are displaced from the predetermined locations. Thus, the workability is remarkably improved in mounting the leading edge skin 19 on the front spar 14.

A structure of the portion where the leading edge skin 19 and the lower skin 18 are fixed on the lower front and rear flanges 14b and 14c of the front spar 14 is substantially the same as the above-described structure of the portion where the leading edge skin 19 and the upper skin 17 are fixed on the upper front and rear flanges 14b and 14c of the front spar 14, and thus overlapping description of the structure of the latter will be omitted.

The procedure of a method of assembling the leading edge skin 19 on the front spar 14 with the height difference adjusting members 25 interposed therebetween will now be described.

The upper skin 17 and the lower skin 18 are fixed to the main wing 12 so as to cover the main spar 13, the front spar 14, the rear spar 15 and the ribs 16. In this main wing 12 in the midstream of assembling, the leading edge skin 19 is directly preassembled on the front flanges 14b, 14b of the front spar 14 without interposing the height difference members 25 therebetween. In this state, differences in height in the abutment portions between the front ends of the upper skin 17 and the lower skin 18 and the rear ends of the leading edge skin 19 are measured, with a measuring device using laser light or the like, at a plurality of locations in the span direction (at the locations at which the leading edge skin 19 is fixed by the fasteners 22).

The wall thicknesses of the leading edge skin 19, the upper skin 17 and the lower skin 18, and the heights of the surfaces of the front and rear flanges 14b and 14c of the front spar 14, and other dimensions are preset so that the surfaces of the front ends of the upper skin 17 and the lower skin 18 protrude beyond the surfaces of the rear ends of the leading edge skin 19 in a state where the height difference adjusting members 25 are not used.

After measuring the differences in height at the plurality of locations on the front spar 14 in the span direction in this way, the height difference adjusting members 25 whose thicknesses are closest to the differences in height at the plurality of locations are selected from the plural types of height difference adjusting members 25 made of plate materials having various thicknesses for accommodating various differences in height. In this regard, the more height difference adjusting members 25 which have various wall thicknesses different in a fine pitch are prepared in advance, the more differences in height can be eliminated by the height difference adjusting members 25.

Subsequently, the selected height difference adjusting members 25 are temporarily mounted at the corresponding locations on the front spar 14 in the span direction. At this time, the height difference adjusting members 25 are held at the temporarily mounted locations by their own resiliency. The leading edge skin 19 is mounted on the front spar 14 with the height difference adjusting members 25 temporarily mounted thereon, and is finally fixed by the fasteners 22 passing through the leading edge skin 19, the shim portions 25a of the height difference adjusting members 25 and the front flanges 14b, 14b of the front spar 14. As a result, the differences in height in the abutment portions between the upper and lower skins 17 and 18 and the leading edge skin 19 is minimized over the entire region in the span direction. Thus, it is possible to smoothen the surface of the front portion of the main wing 12 which has a large influence on the behavior of the boundary layer, thereby improving the performance of the wing.

Figure 5:
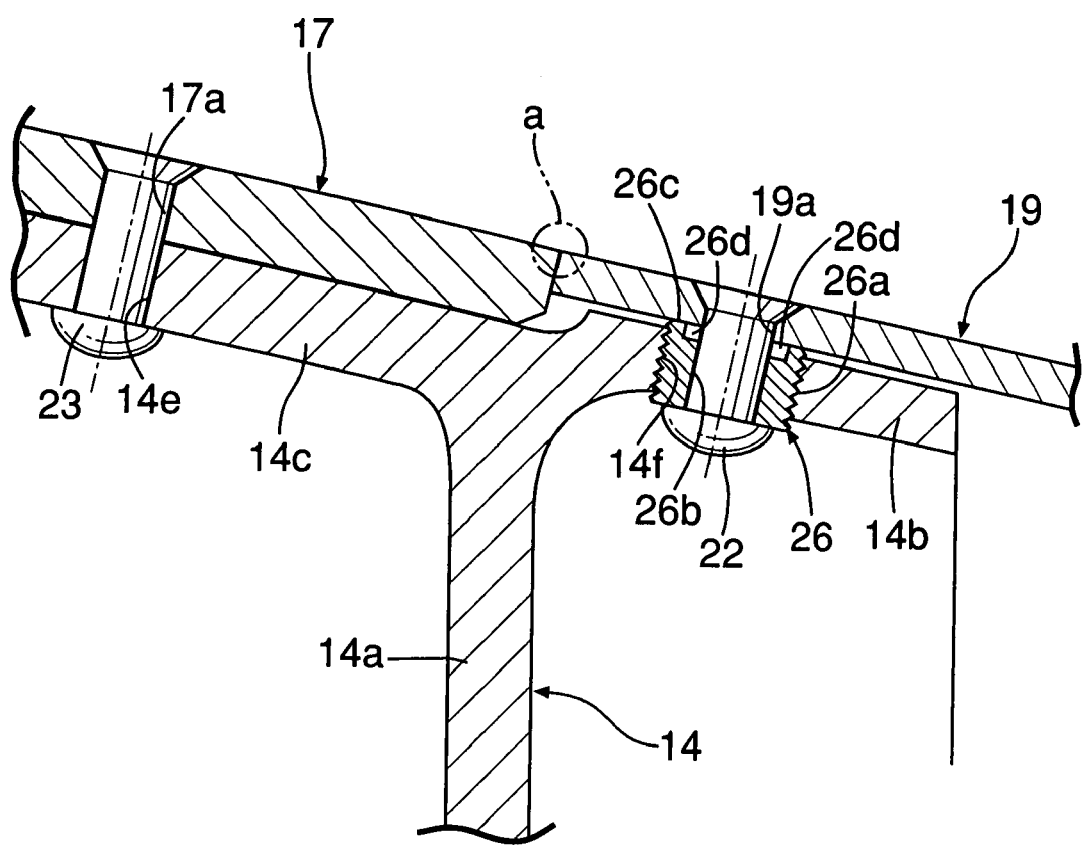
FIG. 5 is a view showing a second embodiment of the present invention, corresponding to FIG. 3.
Figure 6:
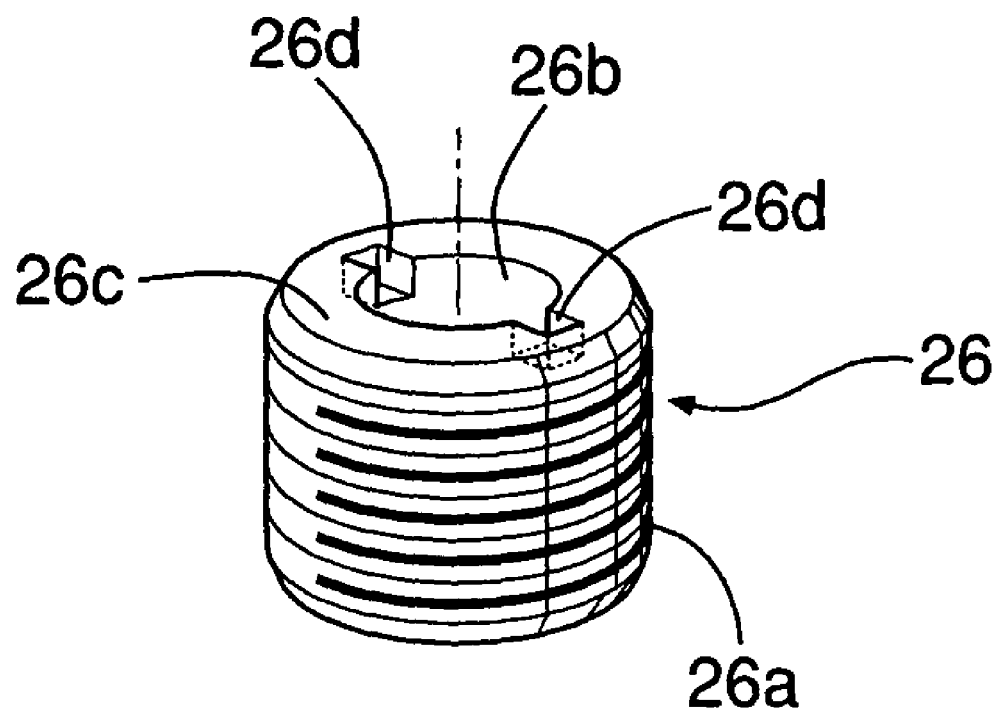
FIG. 6 is a perspective view of a height difference adjusting member according to the second embodiment.

A second embodiment of the present invention will be described with reference to FIGS. 5 and 6.

In the second embodiment, a height difference adjusting member 26 is a generally cylindrical member having a male thread 26a formed on an outer peripheral surface thereof, a fastener hole 26b axially formed therethrough, and a pair of cuts 26d, 26d which are formed in an end surface 26c at one end in the axial direction and with which a slotted screwdriver (not shown) is engaged. On the other hand, female threads 14f are formed in the front flanges 14b of the front spar 14 at a plurality of locations in the span direction (at the locations at which the leading edge skin 19 is fixed by the fasteners 22). The height difference adjusting member 26 are respectively screw-engaged in the female threads 14f. In this screw-engaging, the tip end of the slotted screwdriver is engaged in the pair of cuts 26d, 26d formed in the end surface 26c of each height difference adjusting member 26 and turned, thereby efficiently conducting the screw-engaging operation of the height difference adjusting member 25.

For the purpose of preventing the rotation of the height difference adjusting member 26, it is desirable to charge a rotation-preventing adhesive (not shown) into the space between the female threads 14f and the male threads 26a.

When the male threads 26a of the height difference adjusting members 26 are screw-engaged in the female threads 14f of the front flanges 14b, the amount of screw-engaging of each height difference adjusting member 26 is individually adjusted so that the amount of projection of an end surface 26c of the height difference adjusting member 26 from the surface of the front flange 14b coincides with the difference in height which have been measured with a measuring device using laser light or the like. The leading edge skin 19 is mounted on the front spar 14 on which the height difference adjusting members 26 have been mounted, and is finally fixed thereto by the fasteners 22 passing through the fastener holes 19a of the leading edge skin 19 and the fastener holes 26b of the height difference adjusting members 26. As a result, it is possible to minimize the differences in height in the abutment portions between the upper and lower skins 17 and 18 and the leading edge skin 19 over the entire region in the span direction.

According to the second embodiment, in addition to the effects of the first embodiment, the following effects are further provided wherein only a single type of the height difference adjusting members 26 is required to suppress an increase in the cost due to an increase in the number of parts. The amount of screw engagement in the height difference adjusting members 26 can be steplessly adjusted to completely eliminate the differences in height.

The embodiments of the present invention have been described above, but various changes in design may be made without departing from the subject matter of the present invention.

For example, the embodiments have been described with respect to the main wing 12 of an aircraft, but the present invention is also applicable to a horizontal tail, a vertical tail plane and the like.

Further, the height difference adjusting member 25 in the first embodiment is formed into the shape of J, but it may be formed into the shape of U.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A leading edge skin height difference adjusting structure comprising:
   a height difference adjusting member fixing a rear end of a leading edge skin to a spar of a main wing of an aircraft with the height difference adjusting member interposed therebetween, while adjusting a difference in height between a front end of a main body skin and the rear end of the leading edge skin when the main body skin and the leading edge skin are brought into abutment on each other and fixed on the spar with a fastener;
   wherein the height difference adjusting member is formed from a plate material into a shape including a shim portion and a resilient support portion which are opposed to each other, and is mounted on the spar so as to be resiliently retained relative to a flange of the spar between the shim portion and the resilient support portion; and
   wherein the leading edge skin is fixed to the flange by the fastener in a state wherein the shim portion is interposed between the leading edge skin and the flange.

2. The leading edge skin height difference adjusting structure according to claim 1, wherein the height difference adjusting member is J-shaped in cross section.

3. The leading edge skin height difference adjusting structure according to claim 1, wherein the height difference adjusting member is U-shaped in cross section.

4. The leading edge skin height difference adjusting structure according to claim 1, wherein the shim portion is formed in a plurality of thickness for accommodating variances in the height difference.

5. The leading edge skin height difference adjusting structure according to claim 1, wherein the shim includes an aperture for securing the height difference adjusting member to the spar.

6. The leading edge skin height difference adjusting structure according to claim 1, wherein the height difference adjusting member includes a guide portion bent in a direction away from the shim portion and provided at a distal end of the resilient support portion for facilitating the mounting of the height difference adjusting member relative to the spar.

7. The leading edge skin height difference adjusting structure according to claim 1, wherein the height difference adjusting member includes a connecting portion for connecting the shim portion to the resilient support portion, said connecting portion being of a predetermined height for accommodating the thickness of the spar.

8. The leading edge skin height difference adjusting structure according to claim 1, wherein resilient support portion is of a predetermined length that is less than a predetermined length of said shim portion.

9. The leading edge skin height difference adjusting structure according to claim 8, wherein said resilient support portion and said shim portion are integrally connected together with a connecting portion having a predetermined height.

10. The leading edge skin height difference adjusting structure according to claim 9, wherein a distance between a distal end of said resilient support portion and a distal end of the shim portion is less than the predetermined height of the connecting portion.

11. The leading edge skin height difference adjusting structure according to claim 1, wherein the main body skin includes an upper skin and a lower skin,
   and when each of the upper skin, the lower skin and the leading edge skin are fastened to the spar, an upper ear end of the leading edge skin is brought into direct abutment with the upper skin of the main body skin, and
   a lower ear end of the leading edge skin is brought into direct abutment with the lower skin of the main body skin.

12. The leading edge skin height difference adjusting structure according to claim 1, wherein the spar of the main wing is a front spar having an I-shaped cross section and includes a web extending in the wing thickness direction, a pair of front flanges projecting forward from upper and lower opposite ends of the web; and a pair of rear flanges projecting rearward from the upper end lower opposite ends of the web.

13. The leading edge skin height difference adjusting structure according to claim 12, wherein the leading edge skin has a wall thickness smaller than those of an upper skin and an lower skin of the main body skin, and to absorb differences between the wall thicknesses, differences in height are set between surfaces of the front flanges and surfaces of the rear flanges of the front spar.

14. The leading edge skin height difference adjusting structure according to claim 1, wherein the main body skin is an upper skin.

15. The leading edge skin height difference adjusting structure according to claim 1, wherein the height difference adjusting member interposed between the rear end of the leading edge skin and the spar of the main wing is selected from a plurality of previously prepared height difference adjusting members which have different thicknesses at their shim portions so that the selected height difference adjusting member makes said difference in height between the front end of the main body skin and the rear end of the leading edge skin set within a predetermined range.

16. The leading edge skin height difference adjusting structure according to claim 15, wherein said predetermined range is 0.5 mm or less.

17. The leading edge skin height difference adjusting structure according to claim 1, wherein the main body skin is an upper skin and the height difference adjusting member interposed between the rear end of the leading edge skin and the spar of the main wing is selected from a plurality of previously prepared height difference adjusting members which have different thicknesses at their shim portions so that the selected height difference adjusting member makes said difference in height between the front end of the upper skin and the rear end of the leading edge skin set within a predetermined range.

18. The leading edge skin height difference adjusting structure according to claim 17, wherein said predetermined range is 0.5 mm or less.

19. A leading edge skin height difference adjusting structure comprising:
   a height difference adjusting member fixing a rear end of a leading edge skin to a I-shaped spar of a main wing of an aircraft with the height difference adjusting member interposed therebetween, while adjusting a difference in height between a front end of a main body skin and the rear end of the leading edge skin when the main body skin and the leading edge skin are brought into direct abutment on each other and fixed on the spar with a fastener;
   wherein the height difference adjusting member is formed from a plate material into a shape including a shim portion and a resilient support portion which are opposed to each other, and is mounted on the spar so as to be resiliently retained relative to a flange of the spar between the shim portion and the resilient support portion; and
   wherein the leading edge skin is fixed to the flange by the fastener in a state wherein the shim portion is interposed between the leading edge skin and the flange.

20. A method of assembling a leading edge skin by using a leading edge skin height difference adjusting structure comprising the following steps of:
   temporarily assembling the leading edge skin on the spar to which the main body skin is fixed;
   measuring differences in height between the front end of the main body skin and the rear end of the leading edge skin at a plurality of locations in the span direction of the wing;
   selecting height difference adjusting members having shim portions with thicknesses corresponding to the differences in height;
   temporarily mounting, on the spar, the height difference adjusting members selected with respect to the plurality of locations in the span direction of the wing; and
   mounting the leading edge skin on the spar with the temporarily-mounted height difference adjusting members interposed therebetween, and
   completing the assembly of the leading edge skin with the fasteners.

* * * * *